(12) United States Patent
Cui et al.

(10) Patent No.: US 12,361,070 B1
(45) Date of Patent: Jul. 15, 2025

(54) TAXONOMY-BASED DOCUMENT RETRIEVAL

(71) Applicant: Intuit Inc., Mountain View, CA (US)

(72) Inventors: Wendi Cui, Jersey City, NJ (US); Damien J. Lopez, San Diego, CA (US); Colin P. Ryan, Mountain View, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 18/752,755

(22) Filed: Jun. 24, 2024

(51) Int. Cl.
| | |
|---|---|
| *G06F 16/9038* | (2019.01) |
| *G06F 16/903* | (2019.01) |
| *G06F 16/906* | (2019.01) |
| *G06F 16/951* | (2019.01) |
| *G06F 16/2457* | (2019.01) |
| *G06F 16/28* | (2019.01) |

(52) U.S. Cl.
CPC .... *G06F 16/9038* (2019.01); *G06F 16/90335* (2019.01); *G06F 16/906* (2019.01); *G06F 16/951* (2019.01); *G06F 16/24578* (2019.01); *G06F 16/285* (2019.01)

(58) Field of Classification Search
CPC .............. G06F 16/908; G06F 16/906; G06F 16/90335; G06F 16/9537; G06F 16/9535; G06F 16/2457
USPC ......................................................... 707/723
See application file for complete search history.

(56) References Cited

U.S. PATENT DOCUMENTS

| | | | | |
|---|---|---|---|---|
| 6,446,061 | B1 * | 9/2002 | Doerre ................ | G06F 16/355 707/738 |
| 8,296,295 | B2 * | 10/2012 | Morton ................ | G06F 16/334 707/726 |
| 8,392,435 | B1 * | 3/2013 | Yamauchi ......... | G06F 16/90324 707/768 |
| 9,251,245 | B2 * | 2/2016 | Emanuel ............... | G06F 16/36 |
| 2003/0120639 | A1 * | 6/2003 | Potok ................ | G06F 16/9538 |
| 2005/0278378 | A1 * | 12/2005 | Frank ................ | G06F 16/313 707/E17.084 |
| 2008/0154875 | A1 * | 6/2008 | Morscher ............ | G06F 16/353 707/999.005 |

(Continued)

OTHER PUBLICATIONS

Lewis, P., et al., "Retrieval-Augmented Generation for Knowledge-Intensive NLP Tasks", Apr. 12, 2021, 19 pages.

(Continued)

*Primary Examiner* — Shahid A Alam
(74) *Attorney, Agent, or Firm* — Lathrop GPM LLP

(57) ABSTRACT

A method includes receiving a query and applying a classifier to a hierarchical taxonomy and the query to output a query taxonomy array. Each of a number of taxonomy tags has an associated level in a hierarchical taxonomy. The query taxonomy array includes query tags selected, based on a term contained in the query, from the taxonomy tags. The query taxonomy array is compared to article tags associated with articles. The article tags are selected from the taxonomy tags. Shared tags are also identified based on sharing. A list of articles is generated, the list including a subset of articles selected from the articles. The subset of articles are associated with the shared tags. Corresponding scores are assigned to the subset of articles in the list. The list is sorted, based on the corresponding scores, to generate a sorted list of articles. The sorted list is presented.

18 Claims, 6 Drawing Sheets

(56) References Cited

U.S. PATENT DOCUMENTS

| | | | |
|---|---|---|---|
| 2011/0231241 A1* | 9/2011 | Kesari | G06F 16/9535 |
| | | | 705/14.42 |
| 2016/0162574 A1* | 6/2016 | Gorodilov | G06F 16/319 |
| | | | 707/722 |
| 2017/0161339 A1* | 6/2017 | Garg | G06F 16/9535 |

OTHER PUBLICATIONS

Pan, S., et al., "Unifying Large Language Models and Knowledge Graphs: A Roadmap", Jan. 25, 2024, 28 pages.

Feng, J., et al., "Synergistic Interplay Between Search and Large Language Models for Information Retrieval", Dec. 12, 2023, 15 pages.

* cited by examiner

| Level 1 Taxonomy | Level 2 Taxonomy | Level 3 Taxonomy |
|---|---|---|
| Benefits | Donating | We Care Give Back Eligibility |
| | | We Care Give Back Software Donation |
| | Commute | Bike |
| Data | Data Requests | Data Analysis Request |
| | | Data Report Request |
| | New Hire or Rehire Event Data | Hire Date Data Change |
| ... | ... | ... |

TAXONOMY-BASED DOCUMENT RETRIEVAL

BACKGROUND

Searching for documents can be a complicated task for a computer system. From variations in user requests to complex analysis of the documents themselves, there are many ways for computer-based document retrieval to go amiss.

Several tools are available to find documents, such as articles, websites, etc. in a database. However, these tools would be improved if the search requests were better understood and the systems were able to identify the requested documents more quickly.

SUMMARY

One or more embodiments provide for a method. The method includes receiving a query. The method also includes applying a classifier to a hierarchical taxonomy and the query to output a query taxonomy array. The hierarchical taxonomy includes taxonomy tags arranged in a hierarchical list of tags. Each of the taxonomy tags has an associated level in the hierarchical taxonomy. The query taxonomy array includes query tags selected, based on a term contained in the query, from the taxonomy tags. The method also includes comparing the query taxonomy array to article tags. The article tags are associated with articles and the article tags are selected from the taxonomy tags. The method also includes identifying, based on comparing, shared tags. The shared tags include a subset of the taxonomy tags for which first ones of the query tags match second ones of the article tags. The method also includes generating a list of articles. The list of articles includes a subset of articles selected from the articles. The subset of articles are associated with the shared tags. The method also includes assigning corresponding scores to the subset of articles in the list of articles. The method also includes sorting, based on the corresponding scores, the list of articles to generate a sorted list of articles. The method also includes presenting the sorted list of articles.

One or more embodiments provide for a system. The system includes a server including a processor and a data repository in communication with the processor, and storing, a query and a hierarchical taxonomy. The hierarchical taxonomy includes taxonomy tags arranged in a hierarchical list of tags. Each of the taxonomy tags has an associated level in the hierarchical taxonomy. The data repository stores a query taxonomy array. The query taxonomy array includes query tags selected, based on a term contained in the query, from the taxonomy tags. The data repository also stores articles and article tags. The article tags are associated with the articles. The article tags are selected from the taxonomy tags. The data repository also stores shared tags. The shared tags include a subset of the taxonomy tags for which first ones of the query tags match second ones of the article tags. The data repository also stores a subset of articles. The subset of articles is associated with the shared tags. The data repository also stores a list of articles. The list of articles includes the subset of articles selected from the articles. The data repository also stores corresponding scores and a sorted list of articles. The data repository also stores a classifier. The processor is programmed to apply the classifier to the hierarchical taxonomy and to the query to output the query taxonomy array. The system also includes a server controller executable by the processor to perform a computer-implemented method including comparing the query taxonomy array to the article tags. The computer-implemented method also includes identifying, based on comparing, the shared tags. The computer-implemented method also includes generating the list of articles. The computer-implemented method also includes assigning the corresponding scores to the subset of articles. The computer-implemented method also includes sorting, based on the corresponding scores, the list of articles to generate the sorted list of articles. The computer-implemented method also includes presenting the sorted list of articles.

One or more embodiments provide for another method. The method includes receiving a query. The method also includes applying a classifier to a hierarchical taxonomy and the query to output a query taxonomy array. The hierarchical taxonomy includes taxonomy tags arranged in a hierarchical list of tags. Each of the taxonomy tags has an associated level in the hierarchical taxonomy. The query taxonomy array includes query tags selected, based on a term contained in the query, from the taxonomy tags. The method also includes comparing the query taxonomy array to article tags. The article tags are associated with articles and the article tags are selected from the taxonomy tags. The method also includes identifying, based on comparing, shared tags. The shared tags include a subset of the taxonomy tags for which first ones of the query tags match second ones of the article tags. The method also includes generating a list of articles. The list of articles includes a subset of articles selected from the articles. The subset of articles are associated with the shared tags. The method also includes assigning corresponding scores to the subset of articles in the list of articles. Assigning the corresponding scores to the subset of articles in the list of articles includes, for each article in the subset of articles, assigning the corresponding score to each article based on three items. The first item is a location in an article taxonomy array of each of the second ones of the article tags. The article taxonomy array including the second ones of the article tags corresponding to each article. The article taxonomy array is arranged from a most tag detailed to a most generic tag. The second item is a location in the query taxonomy array of each of the first ones of the query tags. The taxonomy tags are arranged in the hierarchical list of tags from most detailed to most generic. The third item is the associated level of each shared tag in the hierarchical taxonomy. The method also includes sorting, based on the corresponding scores, the list of articles to generate a sorted list of articles. The method also includes presenting the sorted list of articles.

Other aspects of one or more embodiments will be apparent from the following description and the appended claims.

DETAILED DESCRIPTION

One or more embodiments are directed to taxonomy-based document retrieval. Specifically, one or more embodiments provide for a taxonomy-based system that classifies both the query and the documents searched in order to find documents that satisfy the request. The taxonomy-based system improves the speed and accuracy of searching the documents.

For example, a database of articles can be queried in an effort to find articles which are relevant to a given topic. As both the articles and the query can be analyzed using the same taxonomy, variations in language and terminology can be avoided. Thus, accuracy of the search is improved.

Additionally, articles may be analyzed in advance of the query in order to speed up the search process. To set up a database for searching, a taxonomy is generated for a specific field covered by the database. The field may be, for example, human resources, insects, or other types of information, etc. The articles in the database are then evaluated and taxonomy tags are associated with the articles. The tags can then be stored in the articles metadata. The taxonomy improves the clarity of represented topics, as each topic is represented by a specific taxonomy word (or term). Thus, one or more embodiments improve the efficiency and consistency of tagging of queries and articles.

When a user query is received, the query is passed to a classifier, or a system of classifiers, to classify which taxonomy words relate to the user's intention as expressed by their query. The metadata is checked to find documents that fit the taxonomy tags representing the user's intention. Finding documents using the metadata avoids searching the individual articles in the database. The filtered documents can then be used to generate the final answer for the user.

Using one or more embodiments, taxonomy-based document search determines the user's intention in a way that avoids inaccuracies caused by inconsistencies in language. Additionally, by examining the document in the database in advance, the search can compare the metadata, rather than the whole document, in order to speed up the search process. Thus, the results of the search are both more accurate and provided quickly.

Figure 1:
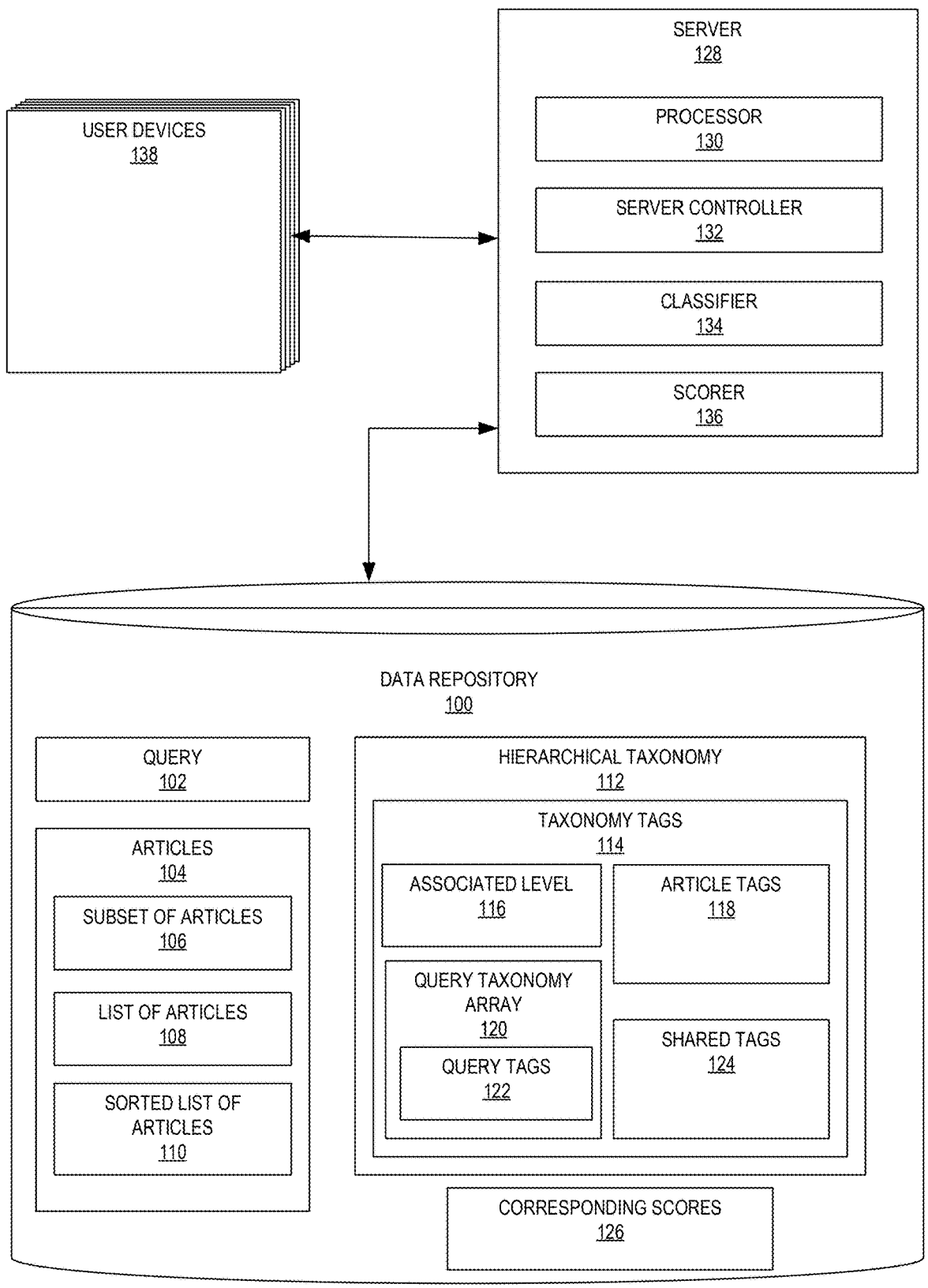
FIG. 1 shows a computing system in accordance with one or more embodiments.

Attention is now turned to the figures. FIG. 1 shows a computing system, in accordance with one or more embodiments. The system shown in FIG. 1 includes a data repository (100). The data repository (100) is a type of storage unit or device (e.g., a file system, database, data structure, or any other storage mechanism) for storing data. The data repository (100) may include multiple different, potentially heterogeneous, storage units and/or devices.

The data repository (100) stores a query (102). The query (102) is alphanumeric text or an image received from a user device, such as the user devices (138) defined below, or some other computing process. The query (102) may have been submitted to find information specified in the query (102).

The data repository (100) also stores a number of articles (104). The number of articles (104) are computer files or other data structures that contain information that may be of interest to a user. The number of articles (104) may be the subject of the query (102).

Figure 2:
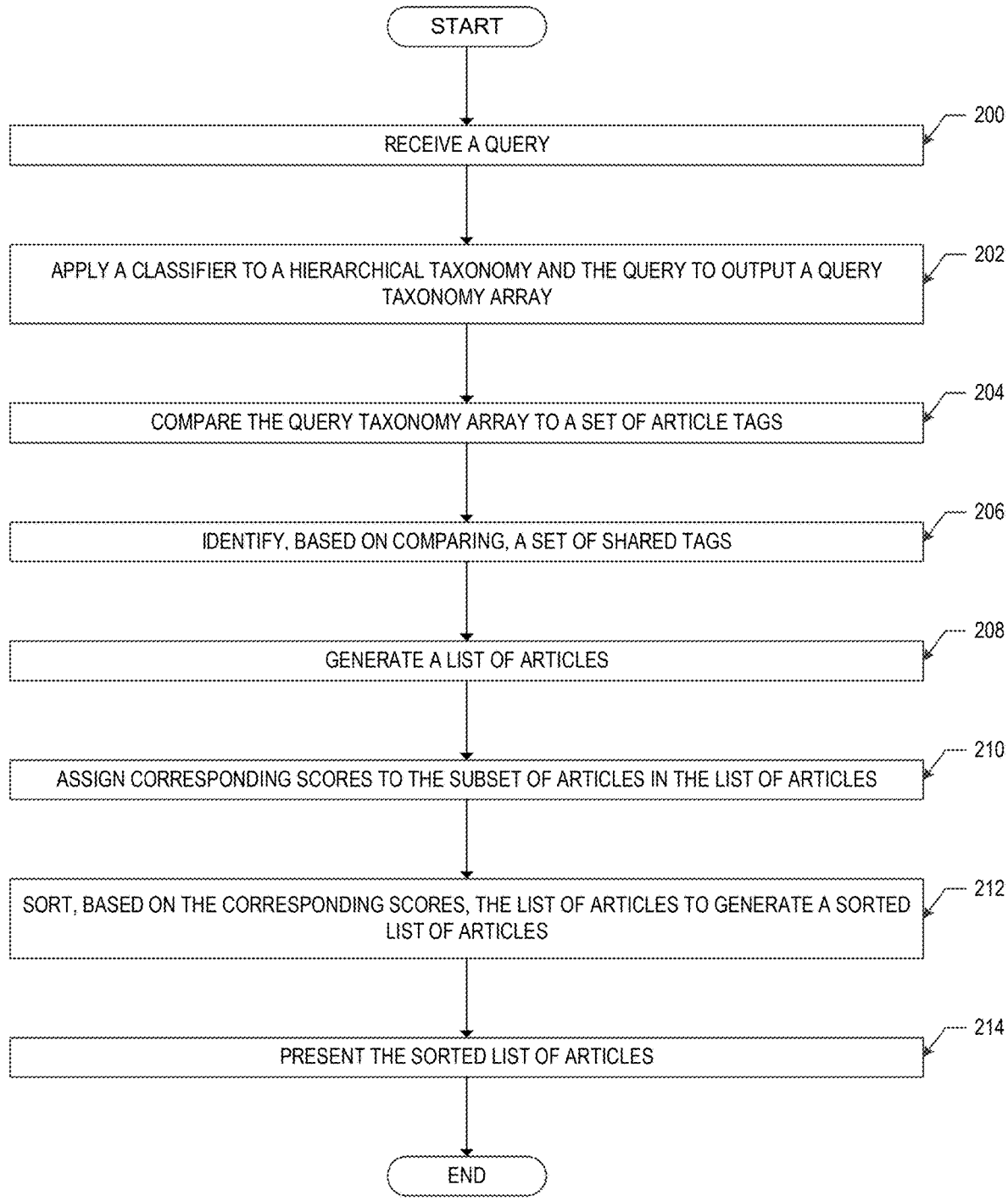
FIG. 2 shows a flowchart of a method for taxonomy-based document retrieval, in accordance with one or more embodiments.

The number of articles (104) includes a subset of articles (106). The subset of articles (106) are articles, taken from the number of articles (104), which are found in response to the query (102) when the method of FIG. 2 is performed.

The number of articles (104) also includes a list of articles (108). The list of articles (108) is a list indicating the individual articles in the subset of articles (106). The list of articles (108) may be taken from the subset of articles (106).

The number of articles (104) also includes a sorted list of articles (110). The sorted list of articles (110) is the list of articles (108) after the list has been organized in some manner. For example, the sorted list of articles (110) may be sorted based on a relevancy ranking for each of the subset of articles (106).

The data repository (100) stores a hierarchical taxonomy (112). The hierarchical taxonomy (112) is a set of taxonomy tags (114) arranged in a hierarchical order. The taxonomy tags (114) exist at varying levels of the hierarchy.

Figures 3, 4:
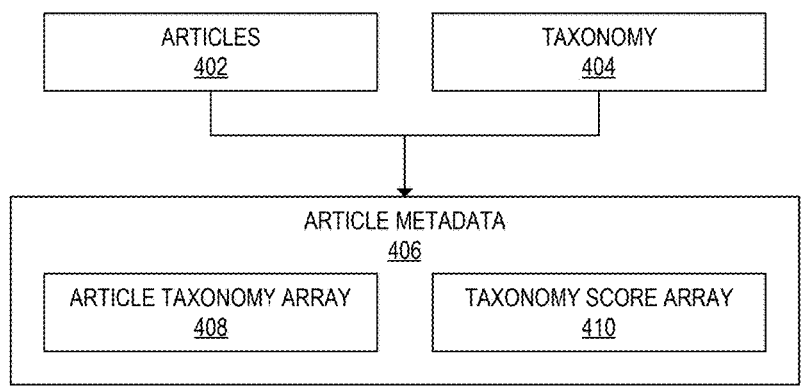
FIG. 3, FIG. 4, FIG. 5, and FIG. 6 shows an example of taxonomy-based document retrieval in accordance with one or more embodiments.

Each of the taxonomy tags (114) has an associated level (116) in the hierarchical taxonomy (112). The associated level (116) is a level, within the hierarchical taxonomy (112), that is associated with a given tag among the taxonomy tags (114). In some embodiments, the hierarchical taxonomy (112) is arranged so that more generic tags among the taxonomy tags (114) have a higher associated level (116). For example, level 1 may be the most generic level, and the more detailed taxonomy tags (114) have a lower associated level (116), such as, level 3, 4, 5, etc. An example of a hierarchical taxonomy (112) of taxonomy tags (114) is shown in FIG. 3.

The taxonomy tags (114) also include a query taxonomy array (120). The query taxonomy array (120) is a set of query tags (122) (defined below) relevant to the query (102). The query taxonomy array (120) may be generated as a result of passing the query (102) to a classifier, as described further with respect to step 202 of FIG. 2. In some embodiments, the query taxonomy array (120) may be limited to a single, most-detailed-level taxonomy tag (114). However, the query taxonomy array (120) may include the most-detailed-level taxonomy tag (114) and any taxonomy tags (114) having a higher associated level (116) in the hierarchical order.

The query tags (122) are members of the taxonomy tags (114). However, the query tags (122) are taxonomy tags (114) assigned to the query (102).

The article tags (118) are members of the taxonomy tags (114). However, the article tags (118) are taxonomy tags (114) assigned to an article in the articles (104). The articles (104) may be evaluated in order to generate, for each individual article, a set of article tags (118), which include the taxonomy tags (114) related to that article, as described further with respect to FIG. 4.

The taxonomy tags (114) include one or more shared tags (124). The shared tags (124) are selected from the taxonomy tags (114) during step 206 of FIG. 2. Specifically, the shared tags (124) refer to ones of the taxonomy tags (114) that are both query tags (122) and article tags (118).

The data repository (100) also stores a set of corresponding scores (126) for each of the subset of articles (106). The corresponding scores (126) represents quantitative relevance scores, assigned to each of the articles (104), that in turn represent how relevant the articles (104) are to the query (102).

The system shown in FIG. 1 also includes a server (128). The server (128) is a computing system, possibly executing in a distributed computing environment.

The server (128) includes a processor (130). The processor (130) is one or more hardware or virtual computer processors. The processor (130) may execute computer readable program code that may embody the method of FIG. 2.

The server (128) also may include a server controller (132). The server controller (132) is software or hardware programmed to operate the server (128) and/or processor (130). The server controller (132) also may be software or hardware programmed to execute one or more steps of the method of FIG. 2. The server controller (132) also may control or coordinate the functions of the classifier (134) and the scorer (136), both defined below.

The server (128) also may include a classifier (134). The classifier (134) is software or hardware programmed to process various inputs, such as, a natural language question (e.g., a query (102)), a document (e.g., an article (104)), or other such file. The classifier (134) may be a classification machine learning model such as a large language model. The classifier (134) may be used to determine one or more taxonomy tags (114) from a hierarchical taxonomy (112) which are relevant to the query (102), as described with respect to step 202 of FIG. 2. The output from the classifier (134) may be an array of the taxonomy tags (114) that are sorted based on the associated level (116) of the taxonomy tags (114).

The server (128) also may include a scorer (136). The scorer (136) is software or hardware programmed to process various inputs, such as, an array of query tags (122) for a query (102), an array of article tags (118) for an article (104), and the hierarchical taxonomy (112). The scorer (136) may be used to determine a corresponding score (126) for the article. The score represents how relevant the article (104) is to the query (102), as described with respect to step 210 of FIG. 2. The output from the scorer (136) may be one or more of the corresponding scores (126).

FIG. 1 also shows one or more user devices (138). The user devices (138) are the computing systems which users use to submit the query (102). The user devices (138) may include a mouse, keyboard, microphone, touch screen, haptic device, etc., with which the user may interact. Thus, the user devices (138) are computing systems which a user may use to interact with the server (128). For example, the query (102) may be received from one or more of the user devices (138), as described in step 200 of FIG. 2.

In many cases, the user devices (138) are not part of a system owned or operated by the entity that owns or operates the server (128). Such user devices (138) may be referred to as "remote" devices, and thus may not be part of the system of FIG. 1. However, one or more of the user devices (138) may be part of the same system of which the server (128) is a part. In this case, such user devices (138) may be referred to as "local" devices, even if the user devices (138) are not in the same physical geographical location. Local devices may be considered part of the system shown in FIG. 1.

While FIG. 1 shows a configuration of components, other configurations may be used without departing from the scope of one or more embodiments. For example, various components may be combined to create a single component. As another example, the functionality performed by a single component may be performed by two or more components.

FIG. 2 shows a flowchart of a method for taxonomy-based document retrieval in accordance with one or more embodiments. The method of FIG. 2 may be executed using the system of FIG. 1.

Step 200 includes receiving a query. The query is received from a user device. A user may generate the query, for example, who is interested in receiving articles relevant to the subject of the query. The query also could be received from an automatic process calling for information in a data repository.

Step 202 includes applying a classifier to a hierarchical taxonomy and the query to output a query taxonomy array. Applying a classifier may include submitting the hierarchical taxonomy and the query as input to the classifier.

A pre-processing step may be performed prior to step 202. The pre-processing step may include converting the hierarchical taxonomy and the query to vector data format. A vector is a data structure, typically in the form of a 1×N data structure, that is suitable for input to a machine learning model, such as the classifier.

Step 204 includes comparing the query taxonomy array to a set of article tags. As defined with respect to FIG. 1, the set of article tags are associated with a corresponding set of articles. Thus, the set of article tags may be selected from the set of taxonomy tags. During step 204, each query tag in the query taxonomy array is checked against the set of article tags in order to determine if there exist any taxonomy tags in both the query taxonomy array and the set of article tags.

Step 206 includes identifying, based on comparing, a set of shared tags. The set of shared tags are those taxonomy tags which are located as a result of the comparison performed in step 204. The set of shared tags include a subset of the set of taxonomy tags for which the first ones of the set of query tags match the second ones of the set of article tags. Thus, the taxonomy tags that are common to both the article tags and the query tags make up a set of shared tags.

Step 208 includes generating a list of articles. The list of articles may include a subset of articles selected from the set of articles. The subset of articles may be associated with the set of shared tags. Accordingly, the list of articles may include those articles which have at least one article tag that matches one of the tags in the query taxonomy array.

Step 210 includes assigning corresponding scores to the subset of articles in the list of articles. For each article in the list of articles, the score is calculated based on the shared tags. The scores for the shared tags in the query taxonomy array may be summed together and assigned to the associated article.

Step 212 includes sorting, based on the corresponding scores, the list of articles to generate a sorted list of articles. The server controller may be configured to arrange the list of articles. For example, the articles may be arranged from highest score to lowest score.

Step 214 includes presenting the sorted list of articles. Presenting may include displaying the list of articles on a user device. However, presenting may also include providing the sorted list of articles to another program for further processing. Presenting also may include storing the sorted list of articles in a non-transitory computer readable storage medium. Presenting also may include transmitting the sorted list of articles to another device, such as a user device.

The method of FIG. 2 may be varied. For example, each tag in the set of taxonomy tags may describe a corresponding knowledge topic. Each taxonomy tag in the set of taxonomy tags may represent a specific topic in the knowledge field. The set of taxonomy tags may be arranged in the hierarchical list of tags from most detailed to most generic. Accordingly, the hierarchical taxonomy may be a description of a general topic, such as insects, and the tags within the hierarchical taxonomy may then describe more detailed topics within the general topic. For example, level 1 topics for insects may be beetles, butterflies, ants, etc.

Figure 6:
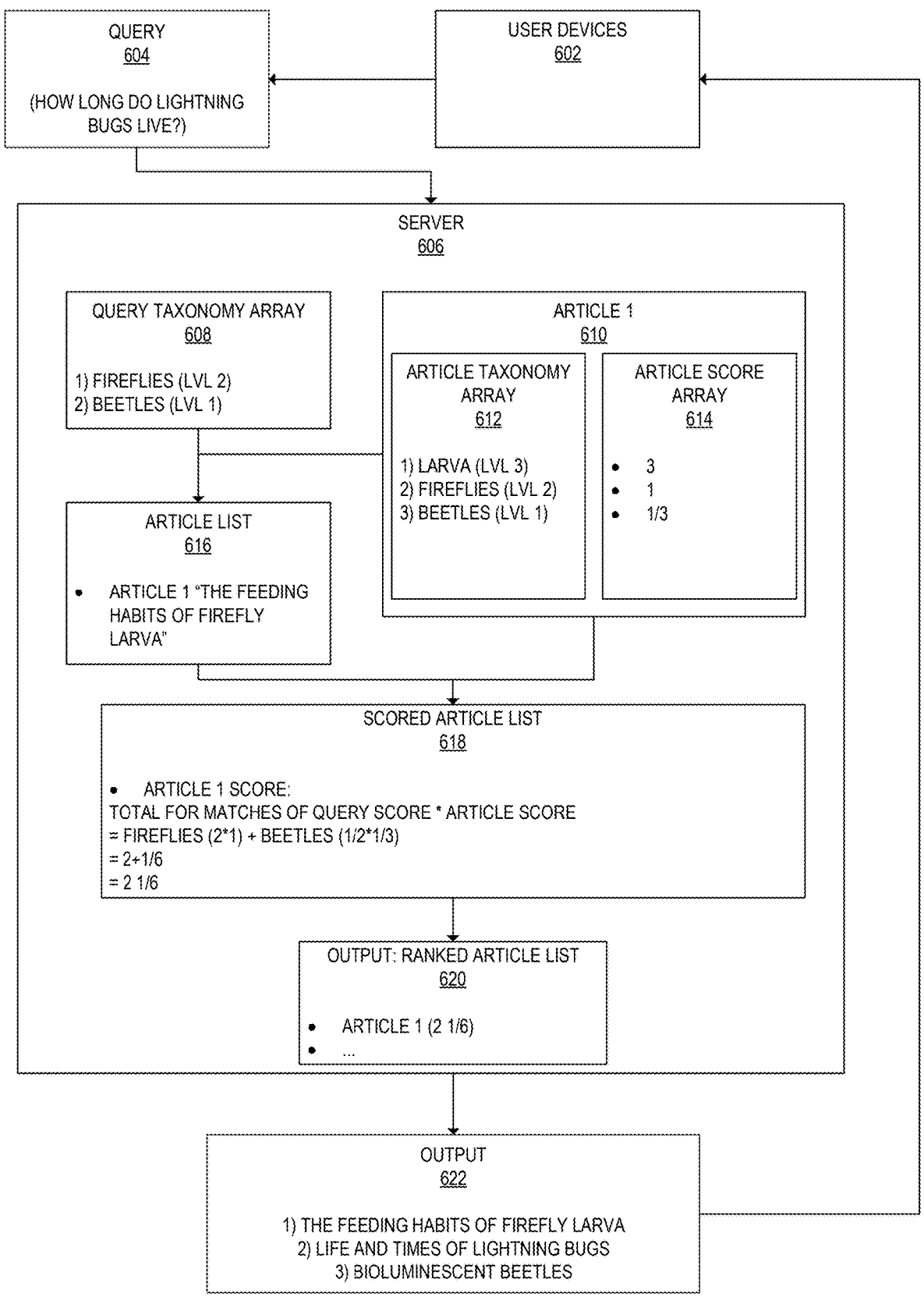

In a further variation of the method of FIG. 2, when assigning the corresponding scores to the subset of articles in the list of articles, a scorer may be used for each article in the subset of articles and assign the corresponding score to each article. The score for an article is based on a score for each article tag which is a shared tag. For each of the shared tags, the location in the query taxonomy array of the query tag that is the shared tag, the location in an article taxonomy array of the article tag that is the shared tag, and the associated level of the tag are used to generate a score value. The article taxonomy array is a sorted array of article tags (e.g., from most detailed to most generic). When assigning the score to a tag, the score for the tag may be (the associated level of the tag divided by the location of the tag in the query taxonomy array) times (the associated level of the tag divided by the location of the tag in an article taxonomy array). The scores for each article tag which is a shared tag are summed together and assigned to the articles. An example of the procedure is shown in FIG. 6.

In another variation of the method of FIG. 2, a predetermined number of the highest scored articles in the sorted list of articles may be presented. For example, the ten highest ranked articles may be presented.

In a further variation of the method of FIG. 2, the method also includes a process for preparing articles for searching. The process starts with receiving a new article. The classifier applies the hierarchical taxonomy and the new article to create new article tags relevant to the new article, which are then selected from the set of taxonomy tags. A ranked taxonomy article array for the new article is generated by arranging the one or more new article tags in order of most detailed to most generic. The ranked taxonomy article array for the new article may be stored in metadata for the set of articles. When a query is received, the articles, including the article, in the ranked taxonomy article array are checked for shared tags.

While the various steps in the flowchart are presented and described sequentially, at least some of the steps may be executed in different orders, may be combined or omitted, and at least some of the steps may be executed in parallel. Furthermore, the steps may be performed actively or passively.

FIG. 3, FIG. 4, FIG. 5, and FIG. 6 show an example of taxonomy-based document retrieval, in accordance with one or more embodiments. Attention is first turned to FIG. 3, which shows an example of a hierarchical taxonomy, such as the hierarchical taxonomy (112) shown in FIG. 1.

FIG. 3. shows a visualization of a portion of a hierarchical taxonomy. The hierarchical taxonomy shown covers a knowledge topic of human resources. The most generic topics include the level 1 taxonomy tags (302) which are shown as "Benefits" and "Data". The level 2 taxonomy tags (304), which are more detailed than the level 1 taxonomy tags (302), include "Donating" and "Commute". The level 3 taxonomy tags (306) are more detailed than the level 2 taxonomy tags (304).

As shown, the hierarchical taxonomy may be considered a tree structure. The root of the tree may be considered the general topic and the most generic tags are the first set of branches of the tree at level 1. The leaves of the tree are the most detailed tags.

Tags that are at a lower level in the hierarchical taxonomy of FIG. 3 may be considered as children (or branches) of a lower-level tag 'above'. Similarly, tags that are at a higher level in the hierarchical taxonomy of FIG. 3 may be considered to be a parent of the lower-level tag. For example, the level 3 "Bike" tag is a more detailed child (branch) of the level 2 "Commute" tag. Conversely, the level 2 "Commute" tag is a parent of the level 3 "Bike" tag. Both the "Donating" tag at level 2 and the "Commute" tag at level 2 are more detailed children of the "Benefits" tag at level 1.

A path through the hierarchical taxonomy may pass through various tags to reach a single, most-detailed tag. As shown, the "We Care Give Back Eligibility" tag has a parent tag of "Donating" which, in turn, has a parent tag of "Benefits". The path would be "Benefits"—"Donating"—"We Care Give Back Eligibility".

In further embodiments, the hierarchical taxonomy may include as many levels as desired. For example, the hierarchical taxonomy may have seven levels, each providing more detail than the tag 'above' it. Likewise, the number of branches at each level may vary.

FIG. 4. shows a visualization of the generation of article metadata (406). The article metadata (406) may be used to improve searching the articles (402), thereby improving the method of FIG. 2. Using a taxonomy (404), articles (402) may be assigned various tags which are considered relevant to the article (402). The assigned tags are then stored in an article taxonomy array (408). Additionally, a taxonomy score array (410) may also be generated and stored in the article metadata (406).

The article taxonomy array (408) includes a detail tag as well as each tag along the path to that detail tag. The tags in the article taxonomy array (408) may be sorted from most detailed to most generic.

In some embodiments a single path may be selected for an article. The single path may be the path that has the most detailed tag. For example, if an article classifies for multiple tags, both "Commute" and "We Care Give Back Eligibility", the article taxonomy array (408) would be generated based on "We Care Give Back Eligibility" as being more detailed (Level 3) than "Commute" (Level 2). In such an embodiment, the resulting article taxonomy array (408) would be ["We Care Give Back Eligibility", "Donating", "Benefits"].

In other embodiments, the article taxonomy array (408) may accommodate multiple paths and/or additional article taxonomy arrays. An associated taxonomy score array (410) may be generated for each path.

The taxonomy score array (410) records a score to each tag in the article taxonomy array (408). The value of the score may be based on both the level of the tag and the location of the tag in the article taxonomy array (408). When using the location in an array, the array may be considered as starting at location "1" and proceeding incrementally with each location. For example, the locations of taxonomy tags in an article taxonomy array with n locations would be: [1, 2, . . . , n].

In one embodiment the score is determined by the level of the tag divided by the location of the tag in the article taxonomy array (408). For example, in an article taxonomy array (408) of ["We Care Give Back Eligibility", "Donating", "Benefits"], the associated taxonomy score array (410) for the tag at the second location ("Donating", which is a level 2 tag as shown in FIG. 3) would be: the location (2) divided by the level (2) which is 1. The associated taxonomy score array (410) would be [3, 1, ⅓].

Figure 5:
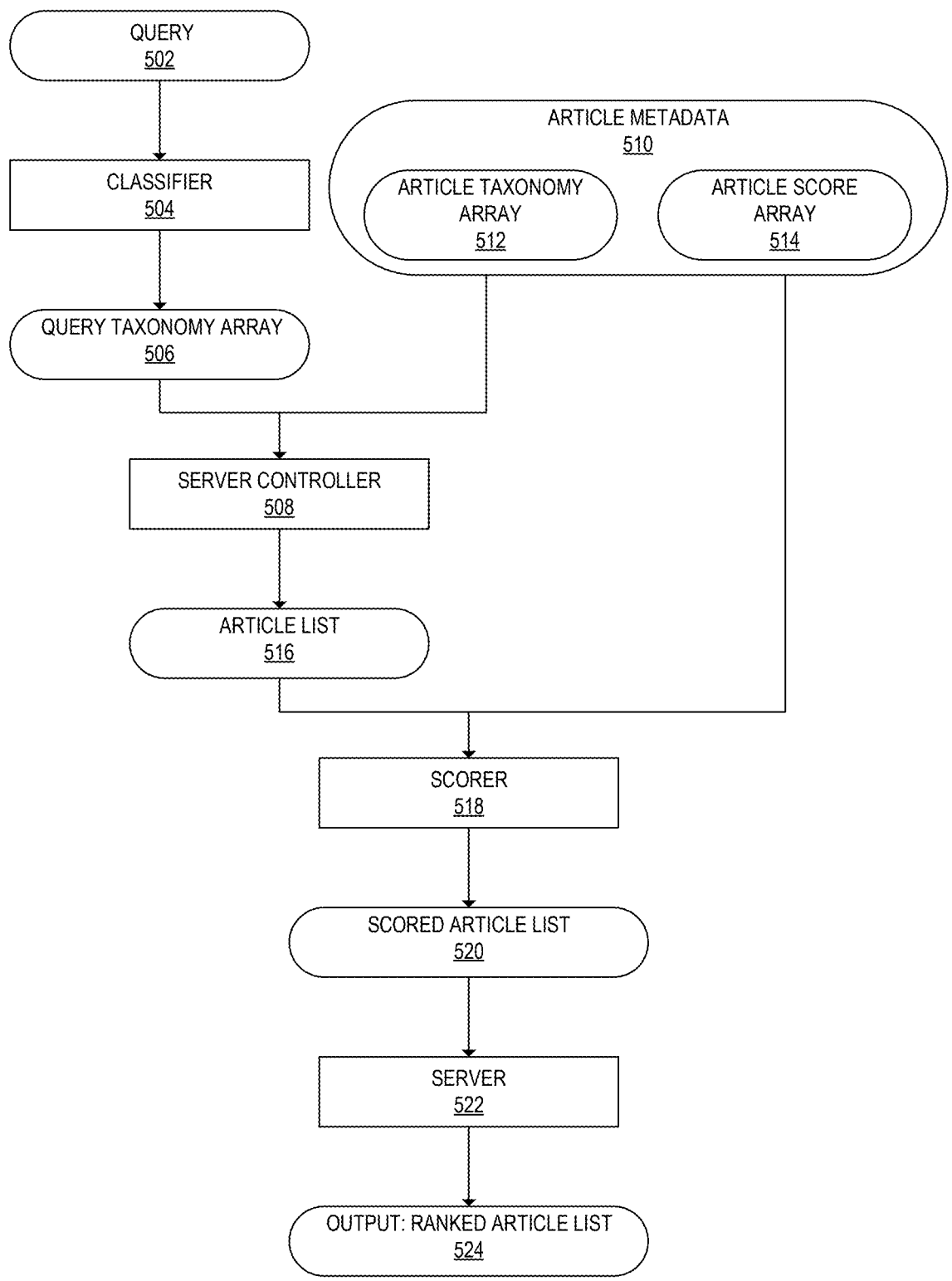

FIG. 5. shows a visualization of the generation of a response to a query (502). The query (502) is received as input, for example, from a user device. The query (502) is passed to a classifier (504) which uses a hierarchical taxonomy to assign various tags to the query. The classifier (504) may be a trained classification machine learning model or may be a large language model. The tags assigned to the query (502) indicate the user's expressed intention.

The tags may be sorted, for example, from most generic to most detailed and used to generate the query taxonomy array (506).

In some embodiments, a query score array may be generated by the classifier (504). The query score array holds a partial score value for each tag in the query taxonomy array (506). The partial score value may be based on both the level of the tag and the location of the tag in the query taxonomy array (506).

The server controller (508) uses the query taxonomy array (506) to search through article metadata (510) and identify articles which have at least one tag in their associated article taxonomy array (512) in common with the tags in the query taxonomy array (506). The identified articles are used to generate an article list (516).

The article list (516) is passed to a scorer (518). The scorer (518) uses the article score array (514) for each article in the article list (516) to assign a score to the article based on the query taxonomy array (506) (or the score array based on the query taxonomy array) and the article score array (514). The score represents how relevant the article is to the query (502). The article list (516) and scores may be combined by the scorer (518) as a scored article list (520).

The server (522) uses the scored article list (520) to provide a ranked article list (524) as output. The ranked article list (524) may be restricted to a threshold number of articles (e.g., top 10, top 100).

The ranked article list (524) may be provided to a large language model (LLM) to generate a final answer. The LLM may take advantage of retrieval-augmented generation (RAG) to extract data from the ranked article list (524) that is relevant to the query (502). The LLM uses the data extracted to formulate a response to the query (502). The response may be a plain-language answer to the query (502).

FIG. 6. demonstrates an example of a query-based search for an article, in accordance with an embodiment. User device (602) sends a query (604) to the server (606). The query (604) looks for articles based on the alpha-numeric string "How long do lightning bugs live?". The alpha-numeric string may be input into the user device (602) using any appropriate technology, for example, keyboard entry, speech recognition, etc.

The server (606) passes the query (604) to a classifier. The classifier uses a hierarchical taxonomy about insects to assign tags to the query (604). The assigned tags are "beetles" and "fireflies". In this example, the query (604) asks about "lightning bugs" which are deemed to be covered by the "fireflies" tag. By using established taxonomy tags, variations in terminology or language may be accounted for. The tags are used to generate a query taxonomy array (608) which includes the tags ["fireflies", "beetles"] (sorted from most detailed to most generic).

The server (606) uses the query taxonomy array (608) to search article metadata and locates article 1 (610). The metadata includes an article taxonomy array (612) and an article score array (614). The article taxonomy array (612) for the article includes [larva, fireflies, beetles] (sorted from most detailed to most generic).

The article score array (614) provides a partial value for each tag in the article taxonomy array (612) to be used to determine the relevance of the article to a query. Each location in the article score array (614) provides a corresponding partial value for the tag in the same location of the article taxonomy array (612), e.g., the partial value in location 1 of the article score array (614) corresponds to the taxonomy tag in location 1 of the article taxonomy array (612). The partial value for a tag is determined by dividing the article's tag level by its location in the article taxonomy array (612). For example, the tag "larva" which is a level 3 tag, is in location 1, and has a value of 3/1=3. Accordingly, the tag "fireflies", which is a level 2 tag, is in location 2 and has a value of 1. The associated article score array (614) is [3, 1, ⅓].

Article 1, titled "The Feeding Habits of Firefly Larva", is used to generate article list (616) with any other articles sharing a tag with the query taxonomy array (608). Each article in the article list (616) is assigned a score based on the query taxonomy array (608), the article taxonomy array (612), and the article score array (614). In the case of article 1, each shared tag (here, "beetles" and "fireflies") is used to calculate the total score. The calculation of the total score uses the location of the tag in the associated array and the level of the tag in the hierarchical taxonomy to generate a value for the tag in the array. The value is determined by dividing the tag's level by its location in the array. For example, in the query taxonomy array (608), the tag "fireflies" has a level of 2 and is in location 1. Thus, the resulting query score is 2/1=2.

As seen above, the article score array (614) uses a similar calculation to that used to determine the total score to determine the partial score for tags in the article taxonomy array (612). For article 1 (610), the tag "fireflies" (which has a level of 2) is in location 2 so the resulting partial score is 2/2=1.

For each of the shared tags, the query scores and article's partial values are multiplied together, and the sum is assigned as the score for the article. For query (604), the sum from the two shared tags is as follows:

$$\text{Score} = \text{Value(fireflies)} = +\text{Value(beetles)}$$
$$= (\text{level/location}) * \text{partial value} + (\text{level/location}) * \text{partial value}$$
$$= (2/1) * 1 \ + (1/2) + (1/3)$$
$$2 + 1/6$$
$$2 \ 1/6$$

The article scores are stored with the article list (616) to generate the scored article list (618). The scored article list (618) is sorted based on the article scores, for example, from highest score to lowest score, to generate the ranked article list (620). The ranked article list (620), or a subset of the ranked article list (620), may be provided as output (622), and returned to the user device (602). The user then may select from among the articles displayed in order to find the answer to the user's query (604).

One or more embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure.

Figure 7A:
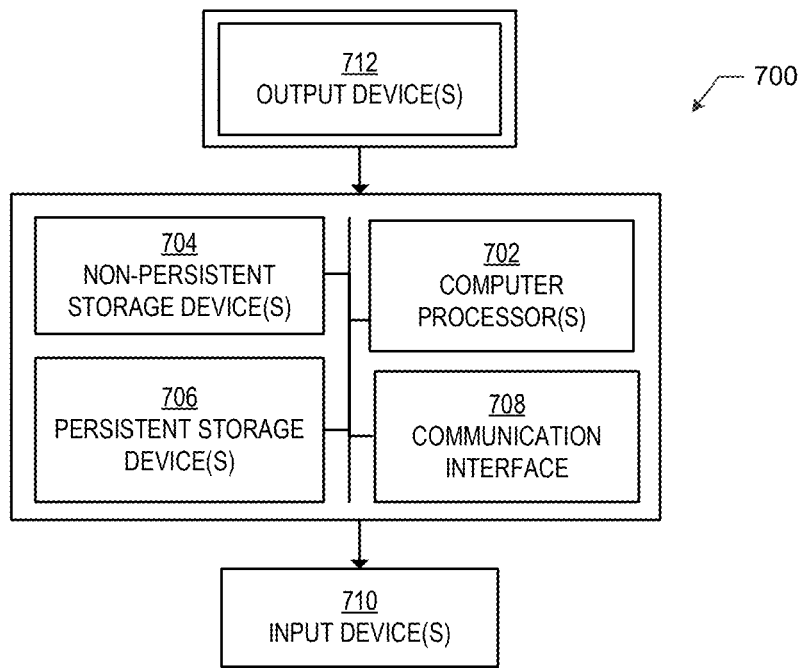
FIG. 7A and FIG. 7B show an example of a computing system and network environment in accordance with one or more embodiments.

For example, as shown in FIG. 7A, the computing system (700) may include one or more computer processor(s) (702), non-persistent storage device(s) (704), persistent storage device(s) (706), a communication interface (708) (e.g., Bluetooth interface, infrared interface, network interface, optical interface, etc.), and numerous other elements and functionalities that implement the features and elements of the disclosure. The computer processor(s) (702) may be an integrated circuit for processing instructions. The computer processor(s) (702) may be one or more cores, or microcores, of a processor. The computer processor(s) (702) includes one or more processors. The computer processor(s) (702) may include a central processing unit (CPU), a graphics processing unit (GPU), a tensor processing unit (TPU), combinations thereof, etc.

The input device(s) (710) may include a touchscreen, keyboard, mouse, microphone, touchpad, electronic pen, or any other type of input device. The input device(s) (710) may receive inputs from a user that are responsive to data and messages presented by the output device(s) (712). The inputs may include text input, audio input, video input, etc., which may be processed and transmitted by the computing system (700) in accordance with one or more embodiments. The communication interface (708) may include an integrated circuit for connecting the computing system (700) to a network (not shown) (e.g., a local area network (LAN), a wide area network (WAN) such as the Internet, mobile network, or any other type of network) or to another device, such as another computing device, and combinations thereof.

Further, the output device(s) (712) may include a display device, a printer, external storage, or any other output device. One or more of the output device(s) (712) may be the same or different from the input device(s) (710). The input device(s) (710) and output device(s) (712) may be locally or remotely connected to the computer processor(s) (702). Many different types of computing systems exist, and the aforementioned input device(s) (710) and output device(s) (712) may take other forms. The output device(s) (712) may display data and messages that are transmitted and received by the computing system (700). The data and messages may include text, audio, video, etc., and include the data and messages described above in the other figures of the disclosure.

Software instructions in the form of computer readable program code to perform embodiments may be stored, in whole or in part, temporarily or permanently, on a non-transitory computer readable medium such as a solid state drive (SSD), compact disk (CD), digital video disk (DVD), storage device, a diskette, a tape, flash memory, physical memory, or any other computer readable storage medium. Specifically, the software instructions may correspond to computer readable program code that, when executed by the computer processor(s) (702), is configured to perform one or more embodiments, which may include transmitting, receiving, presenting, and displaying data and messages described in the other figures of the disclosure.

Figure 7B:
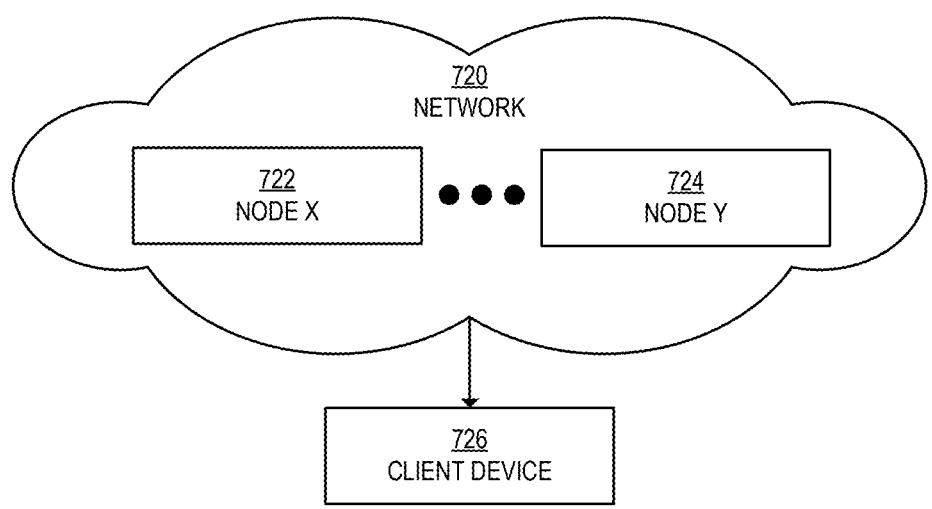

The computing system (700) in FIG. 7A may be connected to, or be a part of, a network. For example, as shown in FIG. 7B, the network (720) may include multiple nodes (e.g., node X (722) and node Y (724), as well as extant intervening nodes between node X (722) and node Y (724)). Each node may correspond to a computing system, such as the computing system shown in FIG. 7A, or a group of nodes combined may correspond to the computing system shown in FIG. 7A. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (700) may be located at a remote location and connected to the other elements over a network.

The nodes (e.g., node X (722) and node Y (724)) in the network (720) may be configured to provide services for a client device (726). The services may include receiving requests and transmitting responses to the client device (726). For example, the nodes may be part of a cloud computing system. The client device (726) may be a computing system, such as the computing system shown in FIG. 7A. Further, the client device (726) may include or perform all or a portion of one or more embodiments.

The computing system of FIG. 7A may include functionality to present data (including raw data, processed data, and combinations thereof) such as results of comparisons and other processing. For example, presenting data may be accomplished through various presenting methods. Specifically, data may be presented by being displayed in a user interface, transmitted to a different computing system, and stored. The user interface may include a graphical user interface (GUI) that displays information on a display device. The GUI may include various GUI widgets that organize what data is shown, as well as how data is presented to a user. Furthermore, the GUI may present data directly to the user, e.g., data presented as actual data values through text, or rendered by the computing device into a visual representation of the data, such as through visualizing a data model.

As used herein, the term "connected to" contemplates multiple meanings. A connection may be direct or indirect (e.g., through another component or network). A connection may be wired or wireless. A connection may be a temporary, permanent, or a semi-permanent communication channel between two entities.

The various descriptions of the figures may be combined and may include, or be included within, the features described in the other figures of the application. The various elements, systems, components, and steps shown in the figures may be omitted, repeated, combined, or altered as shown in the figures. Accordingly, the scope of the present disclosure should not be considered limited to the specific arrangements shown in the figures.

In the application, ordinal numbers (e.g., first, second, third, etc.) may be used as an adjective for an element (i.e., any noun in the application). The use of ordinal numbers is not to imply or create any particular ordering of the elements, nor to limit any element to being only a single element unless expressly disclosed, such as by the use of the terms "before", "after", "single", and other such terminology. Rather, ordinal numbers distinguish between the elements. By way of an example, a first element is distinct from a second element, and the first element may encompass more than one element and succeed (or precede) the second element in an ordering of elements.

Further, unless expressly stated otherwise, the conjunction "or" is an inclusive "or" and, as such, automatically includes the conjunction "and," unless expressly stated otherwise. Further, items joined by the conjunction "or" may include any combination of the items with any number of each item, unless expressly stated otherwise.

In the above description, numerous specific details are set forth in order to provide a more thorough understanding of the disclosure. However, it will be apparent to one of ordinary skill in the art that the technology may be practiced without these specific details. In other instances, well-known features have not been described in detail to avoid unnecessarily complicating the description. Further, other embodiments not explicitly described above can be devised which do not depart from the scope of the claims as disclosed herein. Accordingly, the scope should be limited only by the attached claims.

What is claimed is:

1. A method comprising:
receiving a query;
applying a classifier to a hierarchical taxonomy and the query to output a query taxonomy array, wherein:
the hierarchical taxonomy comprises a plurality of taxonomy tags arranged in a hierarchical list of tags,
each of the plurality of taxonomy tags has an associated level in the hierarchical taxonomy, and
the query taxonomy array comprises a plurality of query tags selected, based on a term contained in the query, from the plurality of taxonomy tags;
comparing the query taxonomy array to a plurality of article tags, wherein:
the plurality of article tags is associated with a plurality of articles, and
the plurality of article tags is selected from the plurality of taxonomy tags;
identifying, based on comparing, a plurality of shared tags, wherein the plurality of shared tags comprises a tag subset of the plurality of taxonomy tags for which first ones of the plurality of query tags match second ones of the plurality of article tags;
generating a list of articles, wherein:
the list of articles comprises an article subset of articles selected from the plurality of articles, and
the article subset are associated with the plurality of shared tags;
assigning corresponding scores to the article subset in the list of articles;
sorting, based on the corresponding scores, the list of articles to generate a sorted list of articles;
presenting the sorted list of articles;
receiving a new article;
applying the classifier to the hierarchical taxonomy and the new article to output one or more new article tags, wherein:
the one or more new article tags are associated with the new article, and
the one or more of new article tags are selected from the plurality of taxonomy tags;
generating a ranked taxonomy array for the new article by arranging the one or more new article tags in order of most detailed to most generic; and
storing the ranked taxonomy array for the new article in metadata for the plurality of articles.

2. The method of claim 1, wherein each of the plurality of taxonomy tags describes a corresponding knowledge topic.

3. The method of claim 1, wherein assigning the corresponding scores to the article subset in the list of articles comprises:
for each article in the article subset of articles, assigning a particular score in the corresponding scores to the each article based on:
i) an article location in an article taxonomy array of each of the second ones of the plurality of article tags, the article taxonomy array comprising the second ones of the plurality of article tags corresponding to the each article;
ii) a query location in the query taxonomy array of each of the first ones of the plurality of query tags; and
iii) the associated level of each shared tag in the hierarchical taxonomy.

4. The method of claim 3, wherein the article taxonomy array is arranged from a most detailed tag to a most generic tag.

5. The method of claim 1, wherein presenting the sorted list of articles comprises presenting a predetermined number of highest scored articles in the sorted list of articles.

6. The method of claim 1, wherein each taxonomy tag in the plurality of taxonomy tags arranged in the hierarchical list of tags represents a specific topic in a knowledge field.

7. The method of claim 1, wherein the plurality of taxonomy tags is arranged in the hierarchical list of tags from most detailed to most generic.

8. The method of claim 1, further comprising:
generating a taxonomy score array for the new article having a particular score in the corresponding scores for each tag in the ranked taxonomy array for the new article, wherein the particular score is based on a location of the each tag in the ranked taxonomy array for the new article; and
storing the taxonomy score array in the metadata for the plurality of articles.

9. A system comprising:
a server comprising a processor;
a data repository in communication with the processor, and storing:
a query,
a hierarchical taxonomy, wherein the hierarchical taxonomy comprises a plurality of taxonomy tags arranged in a hierarchical list of tags, and wherein each of the plurality of taxonomy tags has an associated level in the hierarchical taxonomy,
a query taxonomy array, wherein the query taxonomy array comprises a plurality of query tags selected, based on a term contained in the query, from the plurality of taxonomy tags,
a plurality of articles,
a plurality of article tags, wherein the plurality of article tags is associated with the plurality of articles, and wherein the plurality of article tags is selected from the plurality of taxonomy tags,
a plurality of shared tags, wherein the plurality of shared tags comprises a tag subset of the plurality of taxonomy tags for which first ones of the plurality of query tags match second ones of the plurality of article tags,
an article subset of articles, wherein the article subset is associated with the plurality of shared tags,
a list of articles, wherein the list of articles comprises the article subset selected from the plurality of articles,
corresponding scores, and
a sorted list of articles;
a classifier, wherein the processor is programmed to apply the classifier to the hierarchical taxonomy and to the query to output the query taxonomy array; and a server controller executable by the processor to perform a computer-implemented method comprising:
  comparing the query taxonomy array to the plurality of article tags;
  identifying, based on comparing, the plurality of shared tags;
  generating the list of articles;
  assigning the corresponding scores to the article subset;
  sorting, based on the corresponding scores, the list of articles to generate the sorted list of articles;
  presenting the sorted list of articles;
  receiving a new article;
  applying the classifier to the hierarchical taxonomy and the new article to output one or more new article tags, wherein:
    the one or more new article tags are associated with the new article, and
    the one or more of new article tags are selected from the plurality of taxonomy tags;
  generating a ranked taxonomy array for the new article by arranging the one or more new article tags in order of most detailed to most generic; and
  storing the ranked taxonomy array for the new article in metadata for the plurality of articles.

10. The system of claim 9, wherein each of the plurality of taxonomy tags describes a corresponding knowledge topic.

11. The system of claim 9, wherein assigning the corresponding scores to the article subset of articles in the list of articles comprises:
  for each article in the article subset, assigning a particular score in the corresponding scores to the each article based on:
    i) an article location in an article taxonomy array of each of the second ones of the plurality of article tags, the article taxonomy array comprising the second ones of the plurality of article tags corresponding to the each article;
    ii) a query location in the query taxonomy array of each of the first ones of the plurality of query tags; and
    iii) the associated level of each shared tag in the hierarchical taxonomy.

12. The system of claim 11, wherein the article taxonomy array is arranged from a most detailed tag to a most generic tag.

13. The system of claim 9, wherein presenting the sorted list of articles comprises presenting a predetermined number of highest scored articles in the sorted list of articles.

14. The system of claim 9, wherein each taxonomy tag in the plurality of taxonomy tags arranged in the hierarchical list of tags represents a specific topic in a knowledge field.

15. The system of claim 9, wherein the plurality of taxonomy tags is arranged in the hierarchical list of tags from most detailed to most generic.

16. The system of claim 9, wherein the computer-implemented method further comprises:
  generating a taxonomy score array for the new article having a particular score in the corresponding scores for each tag in the ranked taxonomy array for the new article, wherein the particular score is based on a location of the each tag in the ranked taxonomy array for the new article; and
  storing the taxonomy score new article array in the metadata for the plurality of articles.

17. A method comprising:
  receiving a query;
  applying a classifier to a hierarchical taxonomy and the query to output a query taxonomy array, wherein:
    the hierarchical taxonomy comprises a plurality of taxonomy tags arranged in a hierarchical list of tags,
    each of the plurality of taxonomy tags has an associated level in the hierarchical taxonomy, and
    the query taxonomy array comprises a plurality of query tags selected, based on a term contained in the query, from the plurality of taxonomy tags;
  comparing the query taxonomy array to a plurality of article tags, wherein:
    the plurality of article tags is associated with a plurality of articles, and
    the plurality of article tags is selected from the plurality of taxonomy tags;
  identifying, based on comparing, a plurality of shared tags, wherein the plurality of shared tags comprises a tag subset of the plurality of taxonomy tags for which first ones of the plurality of query tags match second ones of the plurality of article tags;
  generating a list of articles, wherein:
    the list of articles comprises an article subset of articles selected from the plurality of articles, and
    the article subset are associated with the plurality of shared tags;
  assigning corresponding scores to the article subset in the list of articles, wherein assigning the corresponding scores to the article subset in the list of articles comprises:
    for each article in the article subset, assigning the corresponding score to the each article based on:
      i) an article location in an article taxonomy array of each of the second ones of the plurality of article tags, the article taxonomy array comprising the second ones of the plurality of article tags corresponding to the each article, and the article taxonomy array is arranged from a most tag detailed to a most generic tag;
      ii) a query location in the query taxonomy array of each of the first ones of the plurality of query tags, the plurality of taxonomy tags is arranged in the hierarchical list of tags from most detailed to most generic; and
      iii) the associated level of each shared tag in the hierarchical taxonomy;
  sorting, based on the corresponding scores, the list of articles to generate a sorted list of articles;
  presenting the sorted list of articles;
  receiving a new article;
  applying the classifier to the hierarchical taxonomy and the new article to output one or more new article tags, wherein:
    the one or more new article tags are associated with the new article, and
    the one or more of new article tags are selected from the plurality of taxonomy tags;
  generating a ranked taxonomy array for the new article by arranging the one or more new article tags in order of most detailed to most generic; and
  storing the ranked taxonomy array for the new article in metadata for the plurality of articles.

18. The method of claim 17, wherein presenting the sorted list of articles comprises presenting a predetermined number of highest scored articles in the sorted list of articles.

* * * * *